`US010149122B2`

(12) United States Patent
Lotfallah et al.

(10) Patent No.: US 10,149,122 B2
(45) Date of Patent: Dec. 4, 2018

(54) TECHNIQUES FOR IN-BAND SIGNALING OF SERVICE DESCRIPTION UPDATES IN RTP

(71) Applicant: QUALCOMM Incorporated, San Diego, CA (US)

(72) Inventors: Osama Lotfallah, San Diego, CA (US); Ralph Akram Gholmieh, San Diego, CA (US); Carlos Marcelo Dias Pazos, Carlsbad, CA (US); Nagaraju Naik, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 174 days.

(21) Appl. No.: 15/160,219

(22) Filed: May 20, 2016

(65) Prior Publication Data

US 2017/0078856 A1 Mar. 16, 2017

Related U.S. Application Data

(60) Provisional application No. 62/218,008, filed on Sep. 14, 2015.

(51) Int. Cl.
| | |
|---|---|
| *H04W 4/10* | (2009.01) |
| *H04L 12/18* | (2006.01) |
| *H04L 29/06* | (2006.01) |
| *H04L 29/08* | (2006.01) |

(52) U.S. Cl.
CPC .......... *H04W 4/10* (2013.01); *H04L 12/1881* (2013.01); *H04L 65/1083* (2013.01); *H04L 65/4061* (2013.01); *H04L 65/4076* (2013.01); *H04L 65/608* (2013.01); *H04L 67/141* (2013.01)

(58) Field of Classification Search
CPC ............... H04L 63/0823; H04L 63/061; H04L 9/3247; H04L 12/189; H04L 63/0869; H04W 76/023; H04W 8/005; H04W 60/04; H04W 76/14; H04W 76/10; H04W 12/08; H04W 76/02; H04W 80/10; H04W 4/10; H04W 12/04; H04W 88/04
See application file for complete search history.

(56) References Cited

U.S. PATENT DOCUMENTS

| | | | |
|---|---|---|---|
| 8,929,290 B2 | 1/2015 | Lindner | |
| 9,072,005 B2 | 6/2015 | Walker et al. | |
| 2008/0081604 A1 | 4/2008 | Sung et al. | |
| 2009/0316615 A1* | 12/2009 | Vedantham | H04W 36/02 |
| | | | 370/312 |
| 2014/0307734 A1 | 10/2014 | Luby et al. | |
| 2014/0372570 A1 | 12/2014 | Gupta et al. | |

(Continued)

FOREIGN PATENT DOCUMENTS

CN 101267432 A 9/2008

OTHER PUBLICATIONS

International Search Report and Written Opinion—PCT/US2016/044469—ISA/EPO—dated Oct. 13, 2016.

(Continued)

*Primary Examiner* — Jung Liu
(74) *Attorney, Agent, or Firm* — The Marbury Law Group

(57) ABSTRACT

Systems, methods, and devices of the various embodiments enable signaling, such as in-band signaling, of service description updates in Real-Time Transport Protocol (RTP) streaming over evolved Multimedia Broadcast Multicast Service (eMBMS).

19 Claims, 12 Drawing Sheets

(56) References Cited

U.S. PATENT DOCUMENTS

2014/0372624 A1   12/2014  Wang et al.
2015/0081851 A1*  3/2015  Oyman ............. H04W 74/0833
                                                 709/219
2016/0344726 A1* 11/2016  Stojanovski .......... H04W 76/14
2017/0295475 A1* 10/2017  Patel ....................... H04W 4/10
2017/0374633 A1* 12/2017  Li ........................ H04W 56/001

OTHER PUBLICATIONS

Schulzrinne, et al.,"RTP: A Transport Protocol for Real-Time Applications," IETF RFC 3550, Jul. 2003, XP015009332, 105 pages.

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|V=2|P| subtype |   PT=APP=204  |             length            |
+-+-+-+-+-+-+-+-+-+-+-+-+-+-+-+-+-+-+-+-+-+-+-+-+-+-+-+-+-+-+-+-+
|                           SSRC/CSRC                           |
+-+-+-+-+-+-+-+-+-+-+-+-+-+-+-+-+-+-+-+-+-+-+-+-+-+-+-+-+-+-+-+-+
|                          name (ASCII)                         |
+-+-+-+-+-+-+-+-+-+-+-+-+-+-+-+-+-+-+-+-+-+-+-+-+-+-+-+-+-+-+-+-+
|                     application-dependent data              ...
+-+-+-+-+-+-+-+-+-+-+-+-+-+-+-+-+-+-+-+-+-+-+-+-+-+-+-+-+-+-+-+-+
```

TECHNIQUES FOR IN-BAND SIGNALING OF SERVICE DESCRIPTION UPDATES IN RTP

RELATED APPLICATIONS

The present application claims the benefit of priority to U.S. Provisional Patent Application No. 62/218,008 entitled "Techniques for In-Band Signaling of Service Description Updates in RTP" filed Sep. 14, 2015, the entire contents of which are hereby incorporated by reference.

BACKGROUND

Evolved Multimedia Broadcast Multicast Service (eMBMS) networks support group calls between several computing devices in which each computing device is enabled to gain access to send data to the other computing devices in the group call in an arbitrated manner. For example, a Mission Critical Push-to-Talk (MCPTT) over Long Term Evolution (LTE) architecture may be supported in an eMBMS network in which the MCPTT architecture supports broadcast group calls (e.g., voice and/or data calls) from authorized MCPTT group member computing devices, as well as private calls between pairs of group member computing devices. The MCPTT architecture may be built upon a group communication system enabler in LTE (GC-SE_LTE). The MCPTT may use Real-Time Transport Protocol (RTP) and RTP Control Protocol (RTCP) for providing data and control packets to group member computing devices over the eMBMS network.

The initial schedule fragment for a service may be open ended; however, a group call, such as a MCPTT call, may end or change at any time. When the attributes of the service change, the service description for the service, such as the session description protocol (SDP) and/or schedule fragment for the service indicated in the User Service Bundle Description (USBD), changes as well. When service attributes change, eMBMS service layers not receiving the USBD updates indicating the changes (such as an updated SDP) will no longer properly provision the service to a group call client.

SUMMARY

The systems, methods, and devices of the various embodiments enable signaling, such as in-band signaling, a service description update for a Real-Time Transport Protocol (RTP) streaming service over evolved Multimedia Broadcast Multicast Service (eMBMS). In various embodiments, a Broadcast Multimedia Service Center (BMSC) server may send an application defined RTP Control Protocol (RTCP) packet (APP RTCP packet) to an eMBMS service layer supporting a RTP client on a computing device indicating that a service description update is available. In response to receiving the APP RTCP packet, the eMBMS service layer may receive the service description update via a service discovery channel (SDCH). In various embodiments, when eMBMS service layer supporting a RTP client on a computing device receives a service description update, the eMBMS service layer may provide an APP RTCP packet to the RTP client indicating that the session description protocol (SDP) update is available.

Various embodiments may include generating an APP RTCP packet indicating that a service description update occurred. In some embodiments, the APP RTCP packet is generated by a Broadcast Multimedia Service Center (BMSC) server, such embodiments may further include sending the APP RTCP packet to a computing device consuming the RTP streaming service. In some embodiments, the service description update may be sent to the computing device as a service announcement fragment. In some embodiments, a name of the APP RTCP packet is "SDCH", "service description update," "SDP update," or "schedule update". In some embodiments, the RTP streaming service is a Mission Critical Push-to-Talk (MCPTT) over Long Term Evolution (LTE) group call. Further embodiments may include a server having a processor configured with processor-executable instructions to perform operations of such embodiment methods.

Various embodiments may include receiving an APP RTCP packet indicating that a service description update occurred at an eMBMS service layer of a computing device consuming an RTP streaming service over eMBMS, determining, in the eMBMS service layer, whether the APP RTCP packet indicates that the service description update occurred, and receiving the service description update in response to determining that the APP RTCP packet indicates that the service description update occurred. In some embodiments, the APP RTCP packet may include the service description update, and receiving the service description update in response to determining that the APP RTCP packet indicates that the service description update occurred may include receiving the service description update from the APP RTCP packet in response to determining that the APP RTCP packet indicates that the service description update occurred. In some embodiments, receiving the service description update in response to determining that the APP RTCP packet indicates that the service description update occurred may include reading a service discovery channel (SDCH) to receive the service description update in response to determining that the APP RTCP packet indicates that the service description update occurred. In some embodiments, the service description update may be received as a service announcement fragment, and the service announcement fragment may include an updated SDP.

Some embodiments may further include generating, in the eMBMS service layer, an APP RTCP packet indicating that a new SDP is available in response to receiving the service description update, and sending the APP RTCP packet indicating that the new SDP is available to an RTP client of the computing device consuming the RTP streaming service. In such embodiments, the APP RTCP packet may include the new SDP. Some embodiments may further include fetching the new SDP in response to receiving the APP RTCP packet indicating that the new SDP is available. The embodiments may further include joining or leaving one or more ports of the RTP streaming service in response to receiving the APP RTCP packet indicating that the new SDP is available at the RTP client.

Some embodiments may further include determining, in the eMBMS service layer, a type of the service description update based at least in part on a name of the APP RTCP packet, and consuming, in the eMBMS service layer, the service description update based on the determined type of the service description update. In some embodiments the RTP streaming service may be a Mission Critical Push-to-Talk (MCPTT) over Long Term Evolution (LTE) group call.

Further embodiments include a computing device having a processor configured with processor-executable instructions to perform operations of the methods summarized above. Further embodiments include a computing device including means for performing functions of the methods summarized above. Further embodiments include a non-transitory processor-readable storage medium having stored thereon processor-executable instructions configured to cause a computing device processor to perform operations of the methods summarized above.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

FIG. 7 is a data block diagram of elements of an APP RTCP packet suitable for use in the various embodiments.

DETAILED DESCRIPTION

Figure 1:
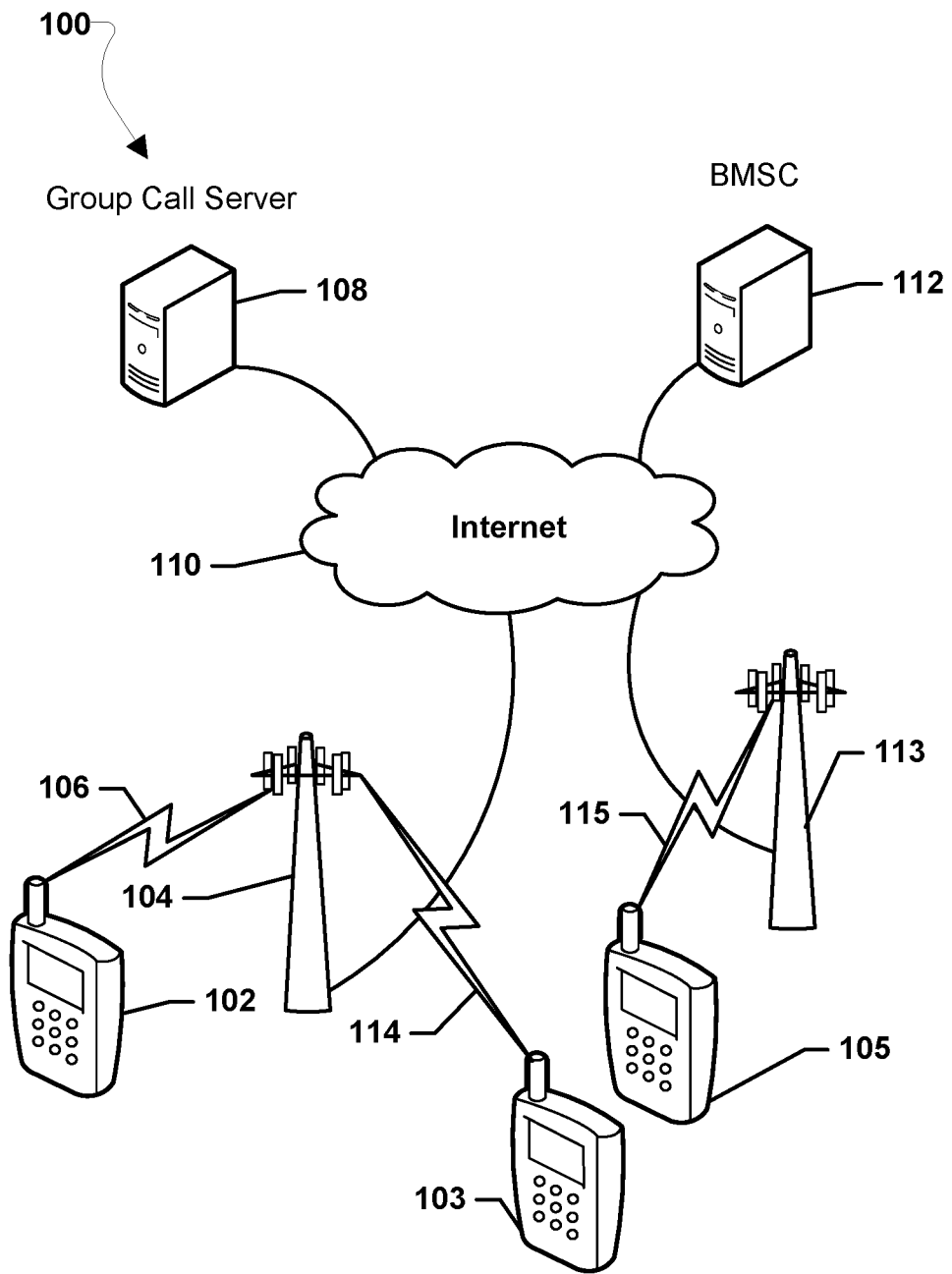
FIG. 1 is a communication system block diagram of a network suitable for use with the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

As used herein, the terms "mobile device", "receiver device", and "computing device" are used interchangeably herein to refer to any one or all of cellular telephones, smart phones, personal or mobile multi-media players, personal data assistants (PDAs), laptop computers, personal computers, tablet computers, smart books, palm-top computers, wireless electronic mail receivers, multimedia Internet enabled cellular telephones, wireless gaming controllers, satellite or cable set top boxes, streaming media players (such as, ROKU™ or CHROMECAST™ or FIRE TV™), smart televisions, digital video recorders (DVRs), and similar personal electronic devices which include a programmable processor and memory and circuitry for receiving files.

The various embodiments are described herein using the term "server" to refer to any computing device capable of functioning as a server, such as a master exchange server, web server, mail server, document server, content server, or any other type of server. A server may be a dedicated computing device or a computing device including a server module (e.g., running an application which may cause the computing device to operate as a server). A server module (e.g., server application) may be a full function server module, or a light or secondary server module (e.g., light or secondary server application) that is configured to provide synchronization services among the dynamic databases on receiver devices. A light server or secondary server may be a slimmed-down version of server-type functionality that can be implemented on a receiver device thereby enabling it to function as an Internet server (e.g., an enterprise e-mail server) only to the extent necessary to provide the functionality described herein.

Evolved Multimedia Broadcast Multicast Service (eMBMS) networks may support group calls between several computing devices where each computing device may be enabled to gain access to send data to the other computing devices in the group call in an arbitrated manner. For example, a Mission Critical Push-to-Talk (MCPTT) over Long Term Evolution (LTE) architecture may be supported in an eMBMS network, in which the MCPTT architecture supports broadcast group calls (e.g., voice and/or data calls) from authorized MCPTT group member computing devices, as well as private calls between pairs of group member computing devices. The MCPTT architecture may be built upon a group communication system enabler in LTE (GCSE_LTE), and the MCPTT may use Real-Time Transport Protocol (RTP) and RTP Control Protocol (RTCP) for providing data and control packets to group member computing devices over the eMBMS network.

A MCPTT architecture may implement Quality of Service (QoS) requirements. For example, a MCPTT architecture's QoS requirements may require each group member computing device to include at least one mandatory Third Generation Partnership Project (3GPP) voice codec and may require the network to provide a 300 millisecond mouth-to-ear latency to each group member computing device. A MCPTT architecture may also provide communication security, such as stream encryption, authentication, access control, and/or regulatory compliance (e.g., allowing lawful interception).

To support group calls over eMBMS, such as group calls provided in a MCPTT architecture, a group call server (e.g., a MCPTT server), may interface with one or more Broadcast Multimedia Service Center (BMSC) servers in the eMBMS network and one or more group member computing devices. The group call server may interface with the group member computing devices via unicast and/or a Multimedia Broadcast Multicast Service (MBMS) to delivery information, such as control and/or data packets, service information, etc., to the group member computing devices. As examples, a group call client running on a group member computing device may send floor control requests to the group call server via unicast over LTE, requests for RTP streaming to the group call server via unicast over LTE and/or the MBMS bearer, and/or data to be RTP streamed to other group member computing devices (e.g., audio and/or video data) to the group call server via unicast over LTE and/or the MBMS bearer. As another example, a group call server may send service set-up and mapping information, such as group name and/or ID, service ID, etc., floor control information, etc. to group member computing devices via unicast over LTE and/or the MBMS bearer.

The group call server may interface with one or more BMSCs to request the allocation/de-allocation of Temporary Mobile Group Identifiers (TMGIs) to the group call, to request the activation, deactivation, and/or modification of an MBMS bearer, and/or to provide data to be RTP streamed to group member computing devices (e.g., audio and/or video data). A BMSC may interface with the group call server to provide status (e.g., QoS reporting) of the MBMS bearer to the group call server.

The one or more BMSCs may provide RTP/RTCP packets to the eNode-Bs serving the group member computing devices, and the eNode-Bs may transmit (e.g., broadcast) the RTP/RTCP packets such that the modems of the group member computing devices may receive the RTP/RTCP packets. The one or more BMSCs may also apply Forward Error Correction (FEC) encoding to the RTP/RTCP packets before they are sent to the eNode-Bs.

A group member computing device may include a group call client including a RTP client running on a processor of the group member computing device, and the RTP client of the group call client may consume the RTP/RTCP packets received from an eNode-B to render the group call (e.g., provide audio and/or video output to a user). The modem of the group member computing device may receive the RTP/RTCP packets, and provide the RTP/RTCP packets to an eMBMS service layer (or eMBMS middleware) running on a processor of the group member computing device.

The eMBMS service layer may perform FEC decoding on the RTP/RTCP packets received from the modem to attempt to recover lost RTP/RTCP packets. The eMBMS service layer may decode the RTP/RTCP packets into the same or new Internet Protocol (IP) addresses and/or port numbers, and may store the RTP/RTCP packets in an IP stack memory location in a memory of the group member computing device.

The RTP client of the group call client may receive the RTP/RTCP packets from the IP stack over IP/User Datagram Protocol (UDP) by joining one or more ports assigned to the service of the RTP/RTCP packets. The one or more port assigned to the service may be indicated in a session description protocol (SDP) generated by the BMSC and sent to the group member computing device via an eNode-B over the service discovery channel (SDCH).

The eMBMS service layer may modify the received SDP and may store the modified SDP in a local cache memory location on the group member computing device. For example, the eMBMS service layer may modify the SDP to remove FEC related parameters and/or to change multicast IP address and/or port numbers.

The RTP client of the group call client may retrieve the modified SDP via a Hypertext Transfer Protocol (HTTP) request (e.g., a GET request) sent to a local HTTP server running on a processor of the group member computing device, such as a local HTTP server operating within the eMBMS service layer, which may provide the modified SDP to the RTP client of the group call client.

To activate a service, an application including a RTP client running on a processor of the group member computing device, such as a group call client, may receive the service ID for the service (e.g., the serviceID) from a group call server (e.g., a MCPTT server). Alternatively, a special service class may be defined for MCPTT services, such as "urn:oma:bcast:oma_bcast:ptt:1.0". The application may request the service definitions for the service (e.g., SDP URL, etc.) from the eMBMS service layer corresponding to the service ID of the service or the service class. As part of eMBMS transport management operations, the application may send a start service indication with the service ID of the service to the eMBMS service layer. In response to receiving the start service indication, the eMBMS service layer may interface with the modem layer to activate the TMGI of the service. The eMBMS service layer may receive the SDP broadcast for the service over the SDCH from the modem layer, and may modify the SDP and host the SDP in a local cache. For example, the eMBMS service layer may modify the SDP to remove FEC related parameters and/or to change multicast IP address and/or port numbers. In response to modifying the SDP, the eMBMS service layer may send a service start notification to the application.

During user plane operations, the eMBMS service layer may receive RTP/RTCP packets from the modem layer and apply FEC decoding to the RTP/RTCP packets. The eMBMS service layer may place the decoded RTP/RTCP packets into the IP stack on the group member computing device at the same or new multicast IP addresses and/or port numbers assigned by the BMSC sending the RTP/RTCP packets. The RTP client of the application may send an HTTP request (e.g., a GET) to a local HTTP server operating within the eMBMS service layer to fetch the SDP, and may join the control and data port for the service at the IP stack indicated in the SDP. In response to multicast joining the IP addresses and ports of the service at the IP stack, the RTP client may receive and consume the RTP/RTCP stream of packets in the IP stack and the application may render the service.

To deactivate a service, the application including the RTP client running may send a stop service indication indicating the service ID of the service to stop to the eMBMS middleware as part of eMBMS transport management operations. In response to receiving the stop service indication, the eMBMS service layer may interface with the modem layer to deactivate the TMGI of the service.

The initial schedule fragment for a service may be open ended; however, a group call, such as a MCPTT call, may end or change at any time. For example, a video component may be added to a service temporally to stream video of an accident scene in addition to the audio from first responders. As a further example, a video component of a service may be discontinued when video is no longer required.

When the attributes of the service (e.g., the available components (e.g., audio, video, etc.), bit rate, TMGIs, etc.) change, the service description for the service, such as the SDP and/or schedule fragment for the service indicated in the User Service Bundle Description (USBD), may change as well. eMBMS service layers not receiving the USBD updates, specifically the SDP updates, may no longer properly provision the service to a group call client when service attributes change.

The systems, methods, and devices of the various embodiments enable in-band signaling of service description updates in RTP streaming over eMBMS. In various embodiments, a BMSC server may send an application defined RTCP packet (APP RTCP packet) to an eMBMS middleware (or service layer) supporting a RTP client on a computing device indicating that a service description update is available. The APP RTCP packet may include an indication that the packet is an application packet, such as a packet code set to "APP" and/or "204". The APP RTCP packet may include a name indicating that the APP RTCP packet is associated with an indication of a service description update. For example, the name may be "SDCH", "service description update", "SDP update", or "schedule update". The name of the APP RTCP packet may reflect the type of service description fragment or service announcement fragment the packet may signal. In an embodiment, the eMBMS service layer may determine a type of service description update associated with the APP RTCP packet based on the APP RTCP packet name, and the eMBMS service layer may consume the service description update when the type indicates that the update is applicable to the eMBMS service layer itself. For example, when the name of the APP RTCP packet indicates that a service announcement fragment reflects an update of a service attribute relevant to the operations of the eMBMS service layer.

In response to receiving the APP RTCP packet, the eMBMS middleware (or service layer) may receive the service description update via SDCH. For example, the eMBMS service layer may receive the updated SDP via SDCH. In this manner, the eMBMS service layer may not wait for periodically scheduled updates of the service description. Rather, the eMBMS service layer may be signaled by the BMSC to retrieve SDP updates as the SDP updates are made available by the BMSC. In an alternative embodiment, the BMSC may include the updated SDP in application-dependent data fields of the APP RTCP packet sent. In this manner, the eMBMS service layer may not fetch the updated SDP via the SDCH because the SDP may be available with the APP RTCP packet.

In various embodiments, in response to receiving the SDP update, the eMBMS service layer may modify the received SDP from BMSC and host the updated SDP in a local cache. For example, the eMBMS service layer may modify the received SDP from BMSC to remove FEC related parameters and/or to change multicast IP address and/or port numbers.

In various embodiments, when eMBMS middleware supporting an RTP client on a computing device receives a service description update, the eMBMS middleware (or service layer) may provide an APP RTCP packet to the RTP client indicating that the service description update is available. The eMBMS service layer may generate an APP RTCP packet indicating that a new SDP is available. The APP RTCP packet may include a name indicating that the APP RTCP packet is associated with a new SDP. For example, the name may be "SDP". The eMBMS service layer may send the APP RTCP packet to the IP stack, and the RTP client may receive the APP RTCP packet from the IP stack. In response to receiving the APP RTCP packet, the RTP client may fetch the modified SDP from the local cache, for example via a HTTP request (e.g., a GET). The RTP client may modify the requests for the service according to the modified SDP. For example, the RTP client may join an additional control and/or data port at the IP stack when the modified SDP indicates an additional RTP/RTCP stream for the service (e.g., an added video stream) is available. As another example, the RTP client may leave a control and/or data port at the IP stack when the modified SDP indicates a RTP/RTCP stream of the service has stopped (e.g., video streaming is discontinued). In an alternative embodiment, the eMBMS service layer may include the modified SDP in application-dependent data fields of the APP RTCP packet sent. In this manner, the RTP client may not fetch the SDP from the local cache because the SDP may be available with the APP RTCP packet.

Various examples of different applications/clients, middleware, layers, radio technologies, and transport protocols are discussed herein, specifically, RTP/RTCP, eMBMS, MCPTT, and HTTP. The discussions of RTP/RTCP, eMBMS, MCPTT, and HTTP are provided merely as examples to better illustrate the aspects of the various embodiments, and are not intended to limit the various embodiments in any way. Other applications/clients, middleware, radio technologies, and transport protocols may be used with the various embodiments, and the other applications/clients, middleware, layers, radio technologies, and transport protocols may be substituted in the various examples without departing from the spirit or scope of the invention.

FIG. 1 illustrates a cellular network system 100 suitable for use with the various embodiments. The cellular network system 100 may include multiple devices, such as a computing devices 102, 103, and 105, one or more cellular towers or base stations 104 and 113, and servers 108 and 112 connected to the Internet 110. The computing devices 102, 103, and 105 may exchange data via one or more cellular connections 106, 114, and 115, respectively, including Code Division Multiple Access (CDMA), Time Division Multiple Access (TDMA), Global System for Mobile communication (GSM), Personal Communications Service (PCS), Third Generation (3G), Fourth Generation (4G), LTE, or any other type connection, with the cellular tower or base stations 104 and 113. The cellular tower or base stations 104 and 113 may be in communication with a router that may connect to the Internet 110. For example, the cellular tower or base stations 104 and 113 may be eNode-Bs. In this manner, via connections to the cellular tower or base stations 104 and 113, and/or Internet 110, data may be exchanged between the computing devices 102, 103, and 105 and the server(s) 108 and 112. In an embodiment, the computing device 102, 103, and 105 may be members of a group call, such as members of a MCPTT group. In an embodiment, server 108 may be a group call server, such as a MCPTT server, supporting group calls between the computing devices 102, 103, and 105 where each the computing device 102, 103, and 105 may be enabled to gain access to send data to the other the computing devices 102, 103, or 105 in the group call in an arbitrated manner. In an embodiment, server 112 may be a BMSC server that may receive RTP packets (data and/or control packets) from the group call server 108 for output to the computing devices 102, 103, and/or 105.

Figure 2:
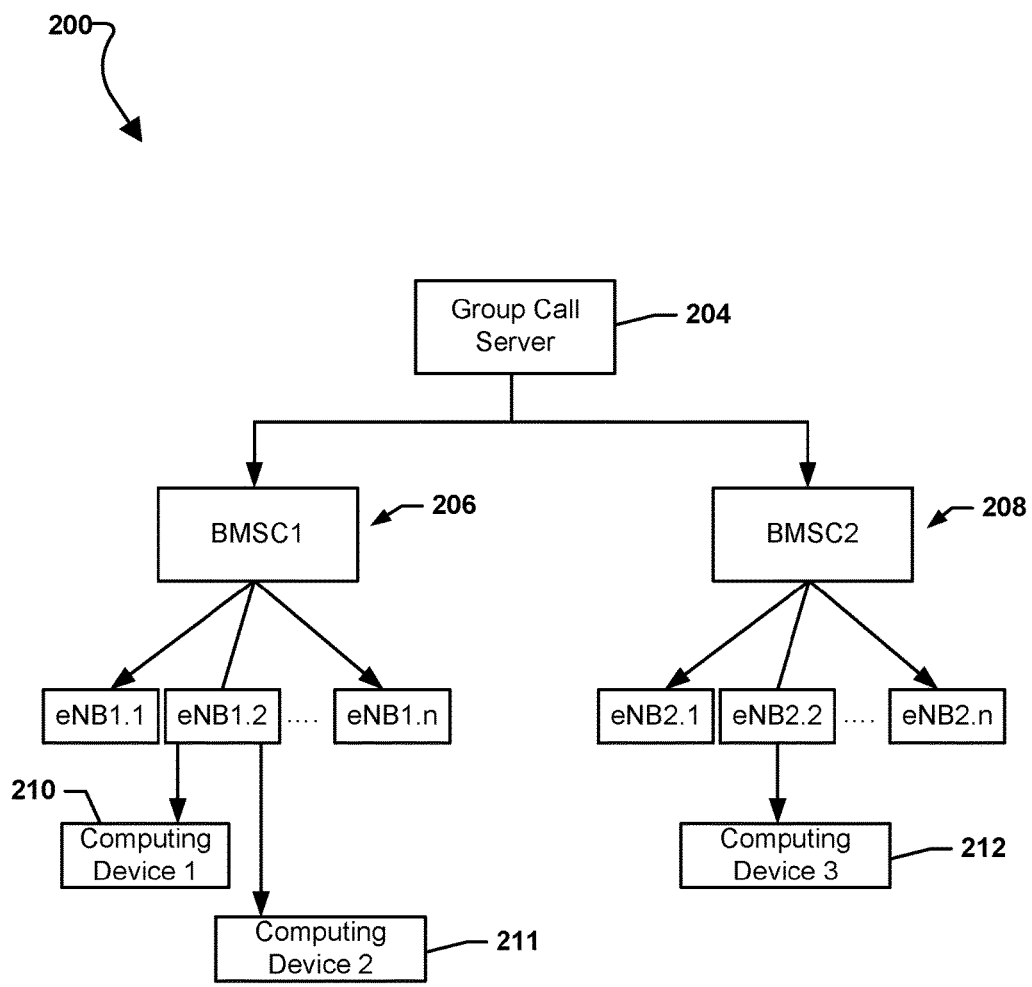
FIG. 2 is a network block diagram illustrating the relationship between network elements and computing devices according to the various embodiments.

FIG. 2 illustrates illustrating the relationship between network elements and the computing devices in a network 200 according to the various embodiments. The RTP/RTCP packets from the group call server 204 may pass from the group call server and be provided to two different portions 206, 208 of the network 200 served by different BMSCs, BMSC1 and BMSC2 and their respective eNode Bs, eNB1.1, eNB1.2, eNB1.n, eNB2.1, eNB2.2, eNB2.n, etc. eNB1.2 may provide the RTP/RTCP packets from BMSC1 to the computing device 1 210 and the computing device 2 211 in the first portion 206, and eNode B eNB2.2 may provide the content to the computing device 3 212 in the second portion 208.

Figure 3:
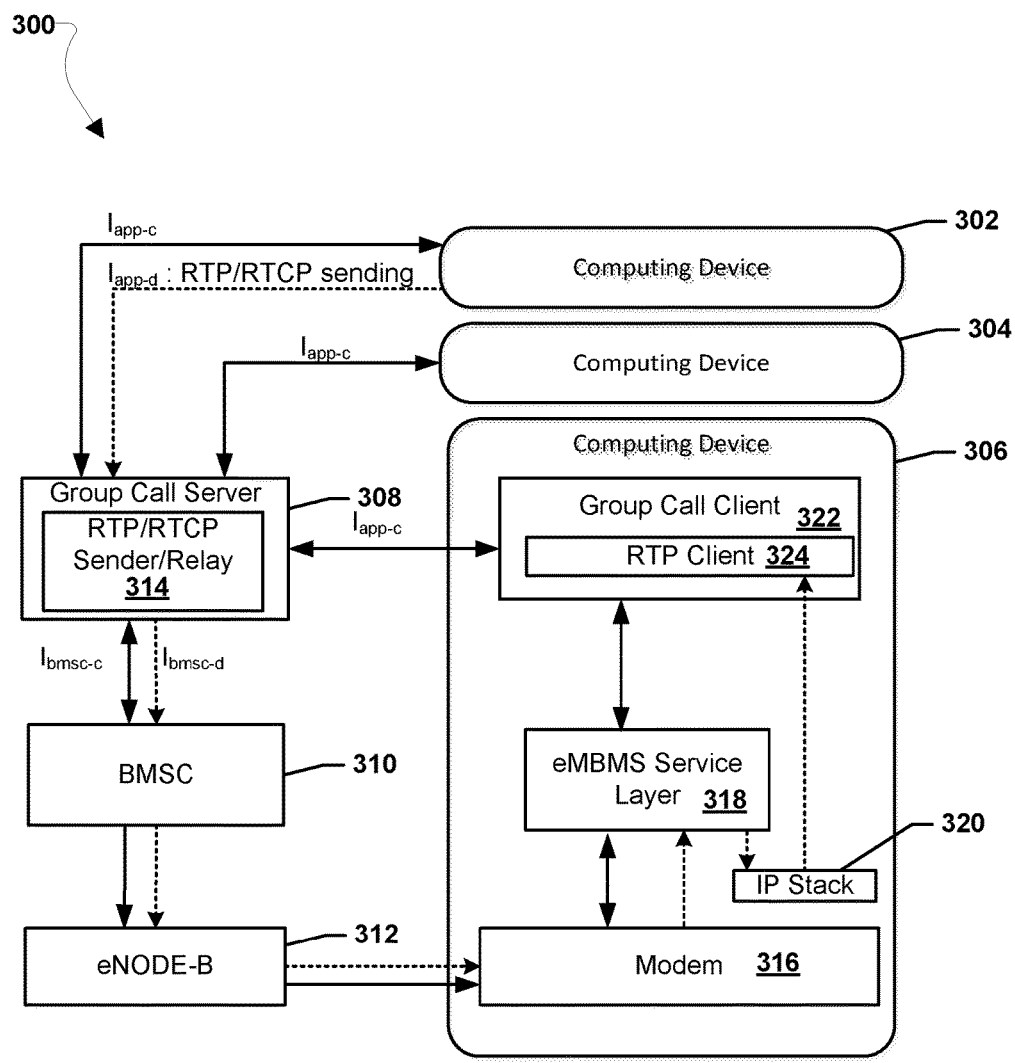
FIG. 3 is a system block diagram illustrating relationships between network elements and computing device application, middleware, and modem layers according to the various embodiments.

FIG. 3 is a system block diagram illustrating relationships between network elements and the computing device application, middleware, and modem layers in a network 300 according to the various embodiments. The computing device 302, the computing device 304, and the computing device 306 may each be members of a group call, such as a MCPTT group call. The computing device 306 may join the group call via eMBMS. To support group calls over eMBMS, such as group calls provided in a MCPTT architecture, the group call server 308 (e.g., a MCPTT server), including a RTP/RTCP sender/relay application 314 running on the group call server 308, may interface with a BMSC server in the network 300 and the computing device 302, the computing device 304, and the computing device 306. The group call server 308 may interface with the computing device 302, the computing device 304, and the computing device 306 via unicast and/or a MBMS bearer to delivery information, such as control and/or data packets, service information, etc., to the computing devices 302, 304, 306. For example, the computing devices 302, 304, and/or 306 may send/receive control information and service information to/from the group call server 308 via application control interfaces $I_{app-c}$, such as floor control requests and requests for RTP streaming. As another example, the computing devices 302, 304, and/or 306 may send data to the group call server 308 via application data interfaces $I_{app-d}$, such as data to be RTP streamed to other group member the computing devices (e.g., audio and/or video data). The interfaces $I_{app-C}$ and $I_{app-D}$ may be established via unicast over LTE and/or the MBMS bearer.

The group call server 308 may interface with the BMSC 310 via control interface $I_{bmsc-c}$ to request the allocation/de-allocation of Temporary Mobile Group Identifiers (TMGIs) to the group call, to request the activation, to request deactivation, and/or to request modification of an MBMS bearer. The BMSC may also provide status (e.g., QoS reporting) of the MBMS bearer to the group call server 308 via control interface $I_{bmsc-c}$. The group call server 308 may also interface with the BMSC 310 via data interface $I_{bmsc-d}$ to RTP data packets to be streamed to the computing device 306 (e.g., audio and/or video data) from the computing device 302. The BMSC 310 may generate RTCP packets and provide the RTCP packets and RTP data packets to the eNode-B 312 serving the computing device 306, and the eNode-B 312 may transmit (e.g., broadcast) the RTP/RTCP packets such that the modem 316 of the computing device 306 may receive the RTP/RTCP packets. The BMSC 310 may also apply Forward Error Correction (FEC) encoding to the RTP/RTCP packets via a FEC encoding client 402 (see FIG. 4) running on the BMSC 310 before the packets are sent to the eNode-B 312.

The modem 316 of the computing device 306 may receive the RTP/RTCP packets and provide the RTP/RTCP packets to an eMBMS service layer 318 running on a processor of the computing device 3 306. The eMBMS service layer 318 may interface with group call client 322 running on a processor of the computing device 306 and the IP stack 320 of the computing device 306. The IP stack 320 of the computing device 306 may provide RTP/RTCP packets to the RTP client 324 of the group call client 322.

Figure 4:
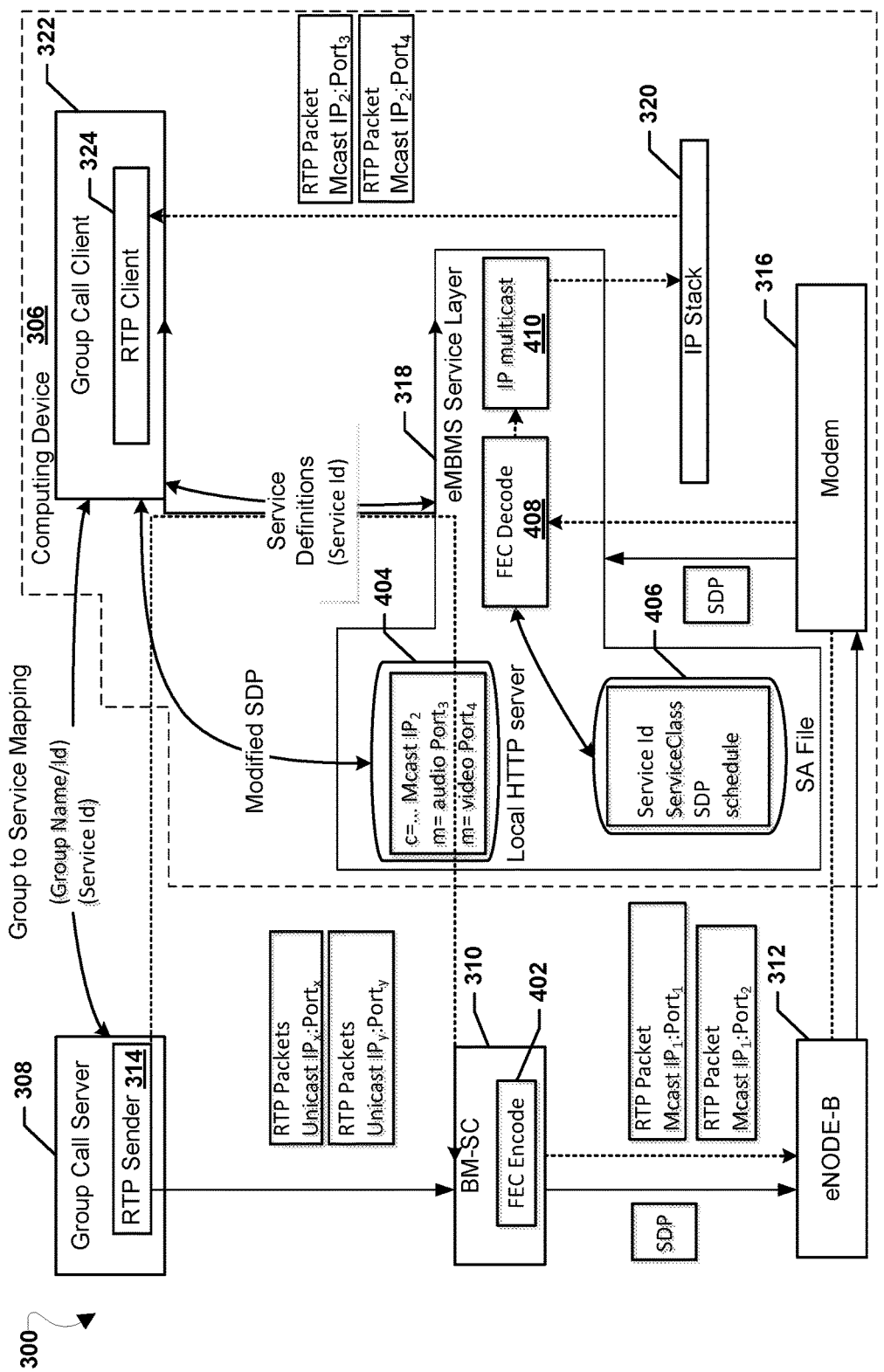
FIG. 4 is another system block diagram illustrating relationships between network elements and computing device application, middleware, and modem layers according to the various embodiments.

FIG. 4 illustrates additional relationships between network elements and application, middleware, and modem layers of the computing device 306 in a network 300 according to the various embodiments. The computing device 306 may include a group call client 322 including a RTP client 324 running on a processor of the computing device 306, and the RTP client 324 may consume the RTP/RTCP packets received from an eNode-B 312 to render the group call (e.g., provide audio and/or video output to a user). The modem 316 of the computing device 306 may receive the RTP/RTCP packets, and provide the RTP/RTCP packets to the eMBMS service layer 318 running on a processor of the computing device 306.

The eMBMS service layer 318 may perform FEC decoding on the RTP/RTCP packets received from the modem to attempt to recover lost RTP/RTCP packets via FEC decode client 408. The eMBMS service layer 318 may decode the RTP/RTCP packets into the same or new Internet Protocol (IP) addresses and/or port numbers in IP multicast client 410, and may store the RTP/RTCP packets in the IP stack 320. The RTP client 324 may receive the RTP/RTCP packets from the IP stack 320 over IP/UDP by joining one or more ports assigned to the service of the RTP/RTCP packets. The one or more ports assigned to the service may be indicated in a SDP generated by the BMSC 310 and sent to the computing device 306 via eNode-B 312 over the service discovery channel (SDCH). The eMBMS service layer 318 may store the SDP and other service information in service announcement (SA) file 406 stored in a memory of the computing device 306.

The eMBMS service layer 318 may modify the received SDP and may store the modified SDP in a local cache memory location accessible by a local HTTP server 404. For example, the eMBMS service layer 318 may modify the SDP to remove FEC related parameters and/or to change multicast IP address and/or port numbers. As illustrated in FIG. 4, the RTP/RTCP packets may be assigned multicast IP addresses and port numbers by the BMSC, such as "Mcast IP1:Port1" and "Mcast IP1:Port2". The mapping of addresses and/or ports on the computing device 306 may differ from the addresses and/or ports assigned by the BMSC. For example, audio for the service may be assigned Port3 on the computing device 306 and video may be assigned Port4 on the device, while the BMSC may assign Port1 to audio and Port2 to video. Additionally, a different multicast IP address, such as "Mcast IP2", may be used by the computing device 306. The eMBMS service layer 318 may modify the SDP and/or any RTP/RTCP packets received to change the addresses and/or ports from those assigned by the BMSC to addresses and/or ports used by the computing device 306. The modification of the RTP/RTCP packets may be performed after FEC decoding by the IP multicast client 410 before the RTP/RTCP packets are placed in the IP stack 320. The RTP client 324 may retrieve the modified SDP via a HTTP request (e.g., a GET request) sent to the local HTTP server 404 which may provide the modified SDP to the RTP client 324. Using the modified SDP, the RTP client may join the appropriate addresses and ports for the service (e.g., "Mcast IP2:Port3" and "Mcast IP2:Port4") and receive the RTP/RTCP packets for the service. Additionally, the group call client 322 may exchange service definitions, such as the service ID for the service, and/or start and stop service indications with the eMBMS service layer 318. The group to service mapping information for the service, such as the group name and/or ID and the service ID may be received by the group call client via unicast from the group call server 308.

Figure 5:
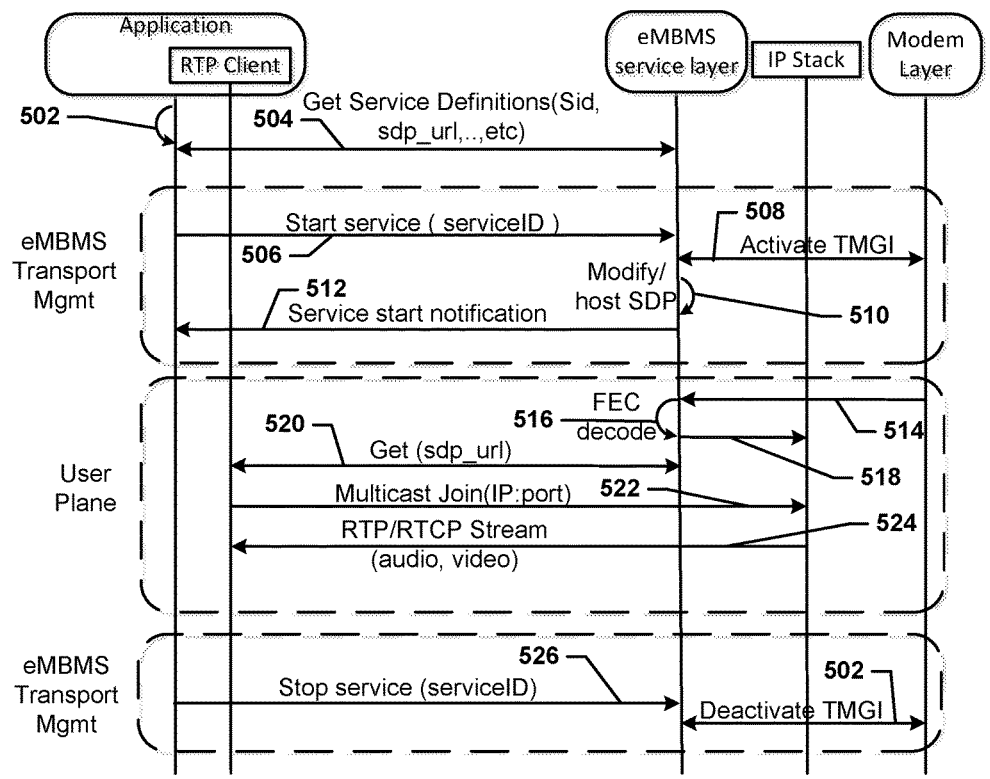
FIG. 5 is a call flow diagram illustrating an embodiment method for providing a RTP streaming service on a computing device.

FIG. 5 is a call flow diagram illustrating an embodiment method for providing a RTP streaming service on a computing device. To activate a service, an application including a RTP client running on a processor of a group member the computing device, such as a group call client, may receive the serviceID from a group call server in operations 502. The application may request and receive the service definitions for the service (e.g., Sid, sdp_url, etc.) from the eMBMS service layer corresponding to the service ID of the service or the service class in operations 504. As part of eMBMS transport management operations, the application may send a start service indication with the service ID of the service to the eMBMS service layer in operation 506. In response to receiving the start service indication, the eMBMS service layer may interface with the modem layer to activate the TMGI of the service in operations 508. The eMBMS service layer may receive the SDP broadcast for the service over the SDCH from the modem layer, and may modify the SDP and host the SDP in a local cache in operations 510. For example, the eMBMS service layer may modify the SDP to remove FEC related parameters and/or to change multicast IP address and/or port numbers. In response to modifying the SDP, the eMBMS service layer may send a service start notification to the application in operation 512.

During user plane operations, the eMBMS service layer may receive RTP/RTCP packets from the modem layer in operations 514 and apply FEC decoding to the RTP/RTCP packets in operations 516. The eMBMS service layer may place the decoded RTP/RTCP packets into the IP stack on the group member computing device at the same or new multicast IP addresses and/or port numbers assigned by the BMSC sending the RTP/RTCP packets in operation 518. The RTP client of the application may send an HTTP request (e.g., a GET) to the local HTTP server operating within the eMBMS service layer to fetch the SDP in operations 520, and may join the control and data port for the service at the IP stack indicated in the SDP in operations 522. In response to multicast joining the IP addresses and ports of the service at the IP stack, the RTP client may receive and consume the RTP/RTCP stream of packets in the IP stack in operations 524 and the application may render the service.

To deactivate a service, the application including the RTP client running may send a stop service indication indicating the service ID of the service to stop to the eMBMS middleware as part of eMBMS transport management operations 526. In response to receiving the stop service indication, the eMBMS service layer may interface with the modem layer to deactivate the TMGI of the service in operations 502.

Figure 6:
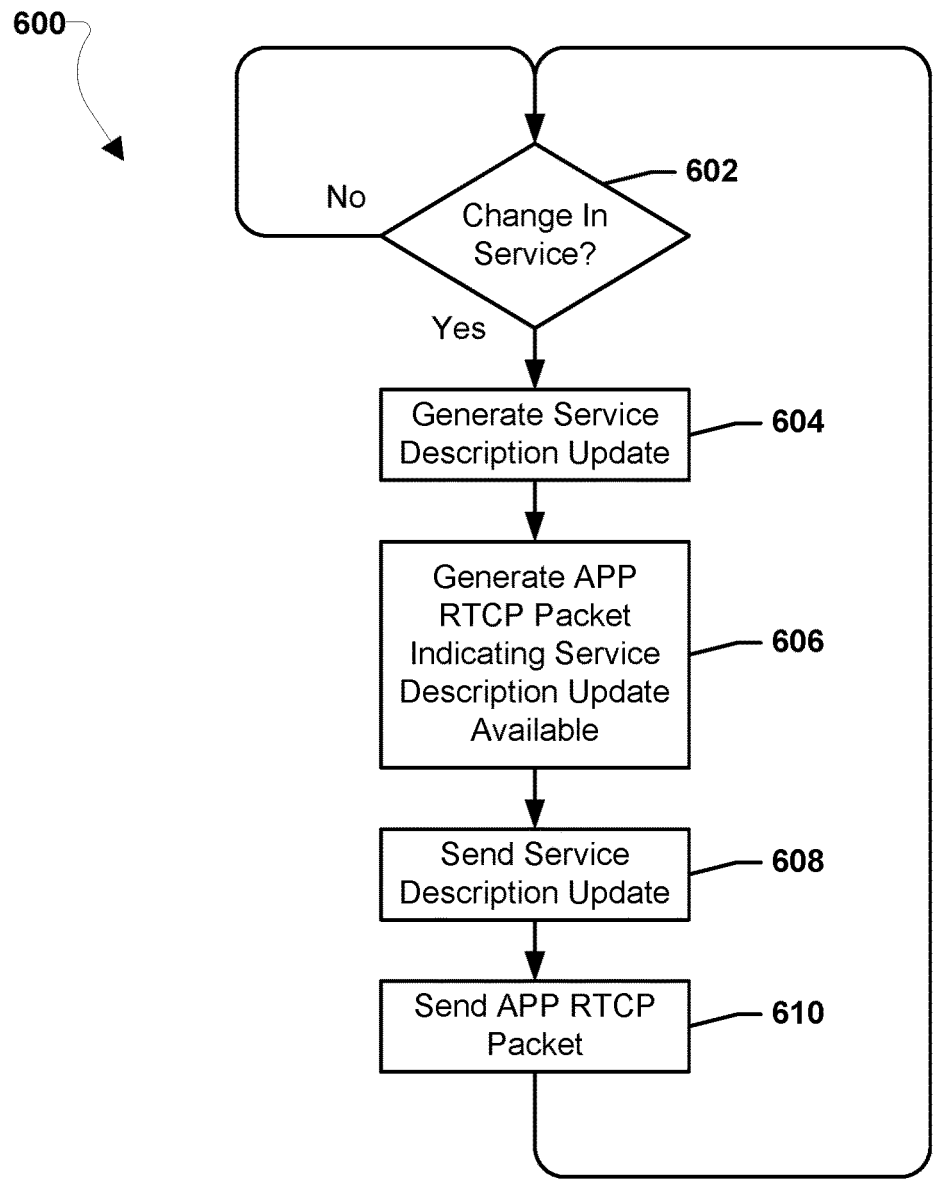
FIG. 6 is a process flow diagram illustrating an embodiment method for sending an APP RTCP packet indicating that a session description update is available according to an embodiment.

FIG. 6 illustrates an embodiment method for sending an APP RTCP packet indicating that a session description update is available. In an embodiment, the operations of method 600 may be performed by a processor of a BMSC server. In determination block 602 the BMSC server may determine whether a change in the service has occurred. A group call group call, such as a MCPTT call, may end or change at any time. For example, a video component may be added to a service temporally to stream video of an accident scene in addition to the audio from first responders. As another example, bit rate changes may require different IP addresses and/or UDP ports to be activated to support selected QoS levels. As a further example, a video component of a service may be discontinued when video is no longer required. The BMSC server may monitor the attributes of the service to determine whether a change in the service has occurred. In response to determining a change in the service has not occurred (i.e., determination block 602="No"), the BMSC server may continue to monitor for a change in service in determination block 602.

In response to determining that a change in the service has occurred (i.e., determination block 602="Yes"), the BMSC server may generate a service description update, such as a session description update, in block 604. When the attributes of the service (e.g., the available components (e.g., audio, video, etc.), bit rate, TMGIs, etc.) may change, the service description for the service, such as the SDP and/or schedule fragment for the service indicated in the User Service Bundle Description (USBD) may change as well. To reflect the change in the service, the BMSC server may generate a service description update, such as a session description update (e.g., a SDP update).

In block 606 the BMSC server may generate APP RTCP packet indicating that a service description update, such as a session description update, is available. The APP RTCP packet may include an indication that the packet is an application packet, such as a packet code set to "APP" and/or "204". The APP RTCP packet may include a name indicating that the APP RTCP packet is associated with an indication of a service description update. For example, the name may be "SDCH", "service description update", "SDP update", or "schedule update. In an embodiment, the name of the APP RTCP packet may reflect the type of service description fragment or service announcement fragment the packet may signal.

In block 608, the BMSC server may send the service description update, such as the session description update, to group member computing devices receiving the service, for example, via SDCH. In block 610 the BMSC server may send the APP RTCP packet, for example, via MBMS bearer. In response to sending the APP RTCP packet, the BMSC server may continue to monitor for a change in service in determination block 602.

In an alternative optional embodiment, the operations of blocks 608 and 610 may be combined such that the BMSC may include the service description, such as an updated SDP or other service announcement fragment, in application-dependent data fields of the APP RTCP packet sent. In this manner, the eMBMS service layer may not need to fetch an updated service description, such as an updated SDP or other service announcement fragment, via the SDCH because the service description, such as the SDP or other service announcement fragment, may be available with the APP RTCP packet.

FIG. 7 is a process data block diagram of elements of an APP RTCP packet 700 suitable for use in the various embodiments. The APP RTCP packet 700 may include an indication that the packet is an application packet, such as a packet code set to "APP" and/or "204". The APP RTCP packet 700 may include a name indicating that the APP RTCP packet is associated with an indication of a service description update and/or a new SDP. As examples, the name may be "SDCH" or "SDP". Additionally, the APP RTCP packet 700 may include application dependent data. For example, the APP RTCP packet 700 may carry an updated SDP.

Figure 8:
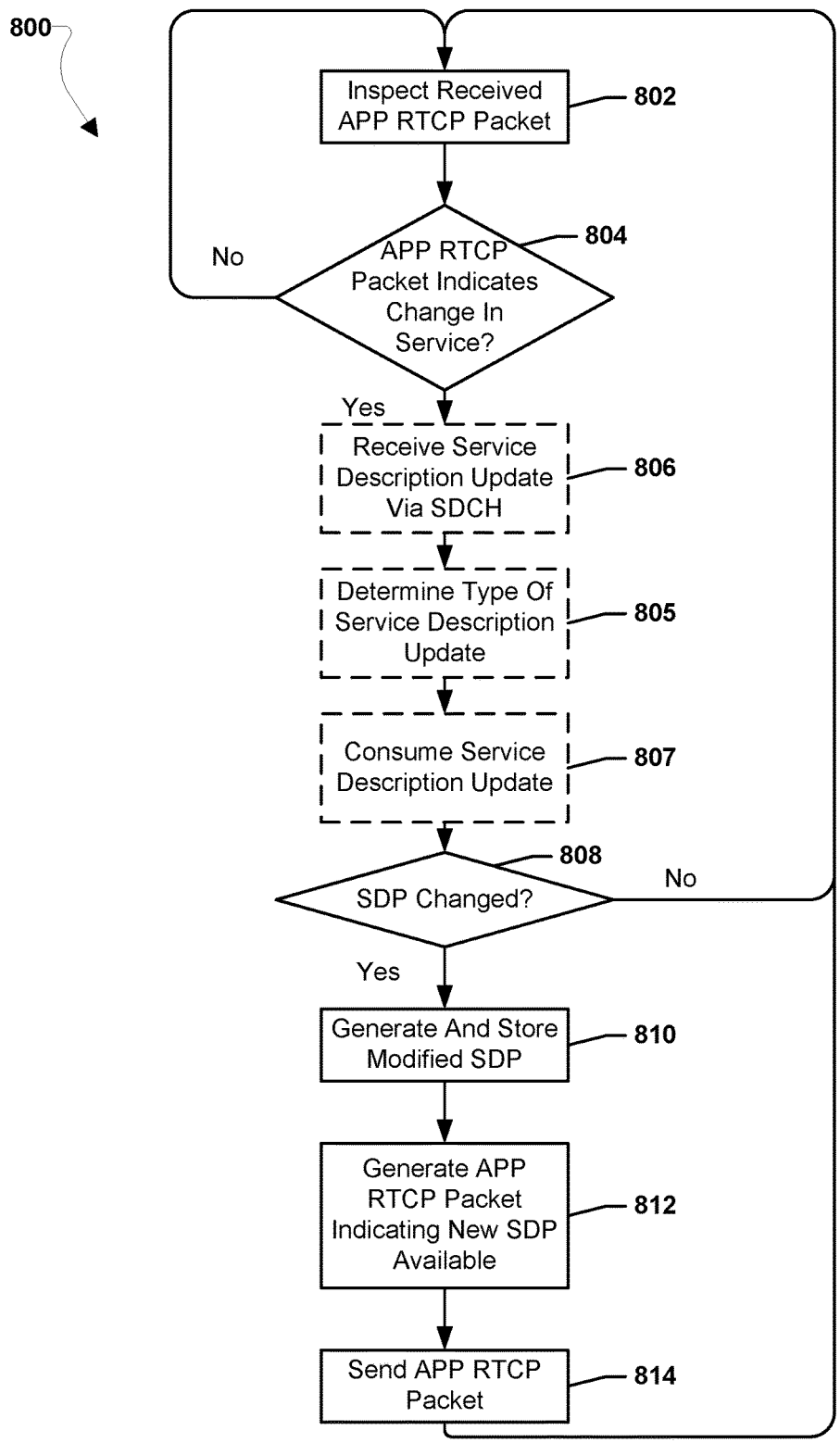
FIG. 8 is a process flow diagram illustrating an embodiment method for sending an APP RTCP packet indicating that a new SDP is available according to an embodiment.

FIG. 8 illustrates an embodiment method 800 for sending an APP RTCP packet indicating that a new SDP. In an embodiment, the operations of method 800 may be performed by a eMBMS service layer running on a processor of a computing device. In block 802 the eMBMS service layer may inspect a received APP RTCP packet. For example, the eMBMS service layer may inspect the APP RTCP packet for an indication the packet is an application packet, such as a packet code set to "APP" and/or "204" and an indication that the packet may be associated with an indication of a service description update. In determination block 804 the eMBMS service layer may determine whether the APP RTCP packet indicates a change in service has occurred. In response to determining a service has not changed (i.e., determination block 804="No"), the eMBMS service layer may continue to inspect packets in block 802.

In response to determining that a service change is indicated (i.e., determination block 804="Yes"), the eMBMS service layer may receive a session description update via SDCH in optional block 806. In this manner, the eMBMS service layer may not wait for periodically scheduled updates of the service description. Rather, the eMBMS service layer may be signaled by the BMSC to retrieve service description updates, such as SDP updates, as the service description updates, such as SDP updates, are made available by the BMSC. Block 806 may be optional because in some embodiments, the BMSC may include the updated service description, such as the updated SDP, in application-dependent data fields of the APP RTCP packet sent. In this manner, the eMBMS service layer may not need to receive an updated service description such as an updated SDP, via the SDCH because the service description, such as the SDP, may be available in the APP RTCP packet.

In optional block 805, the eMBMS service layer may determine a type of service description update associated with the APP RTCP packet based on the APP RTCP packet name. In an embodiment, the name of the APP RTCP packet may reflect the type of service description fragment or service announcement fragment the packet may signal. In optional block 807, the eMBMS service layer may consume the service description update when the type indicates that the update is applicable to the eMBMS service layer itself. Blocks 805 and 807 may be optional because in some embodiments, the name of the APP RTCP may not indicate the type of service description and/or all eMBMS service layers may not be configured to recognize APP RTCP packets as applicable to eMBMS service layer relevant service description updates.

In determination block 808 the eMBMS service layer may determine whether the SDP has changed. In response to determining the SDP has not changed (i.e., determination block 808="No"), the eMBMS service layer may continue to inspect packets in block 802.

In response to determining that the SDP has changed (i.e., determination block 808="Yes"), the processor may generate and store a modified SDP in block 810. For example, the eMBMS service layer may modify the updated SDP to remove FEC related parameters and/or to change multicast IP address and/or port numbers. In block 812 the eMBMS service layer may generate a APP RTCP packet indicating that a new SDP is available. The APP RTCP packet may include a name indicating that the APP RTCP packet is associated with a new SDP. For example, the name may be "SDP". In an embodiment, the eMBMS service layer may include the modified SDP in application-dependent data fields of the APP RTCP packet sent. In this manner, the RTP client may not fetch the SDP from the local cache because the SDP may be available with the APP RTCP packet. In block 814 the eMBMS service layer may send the APP RTCP packet to the IP stack, and in block 802 the eMBMS service layer may continue to inspect packets.

Figure 9:
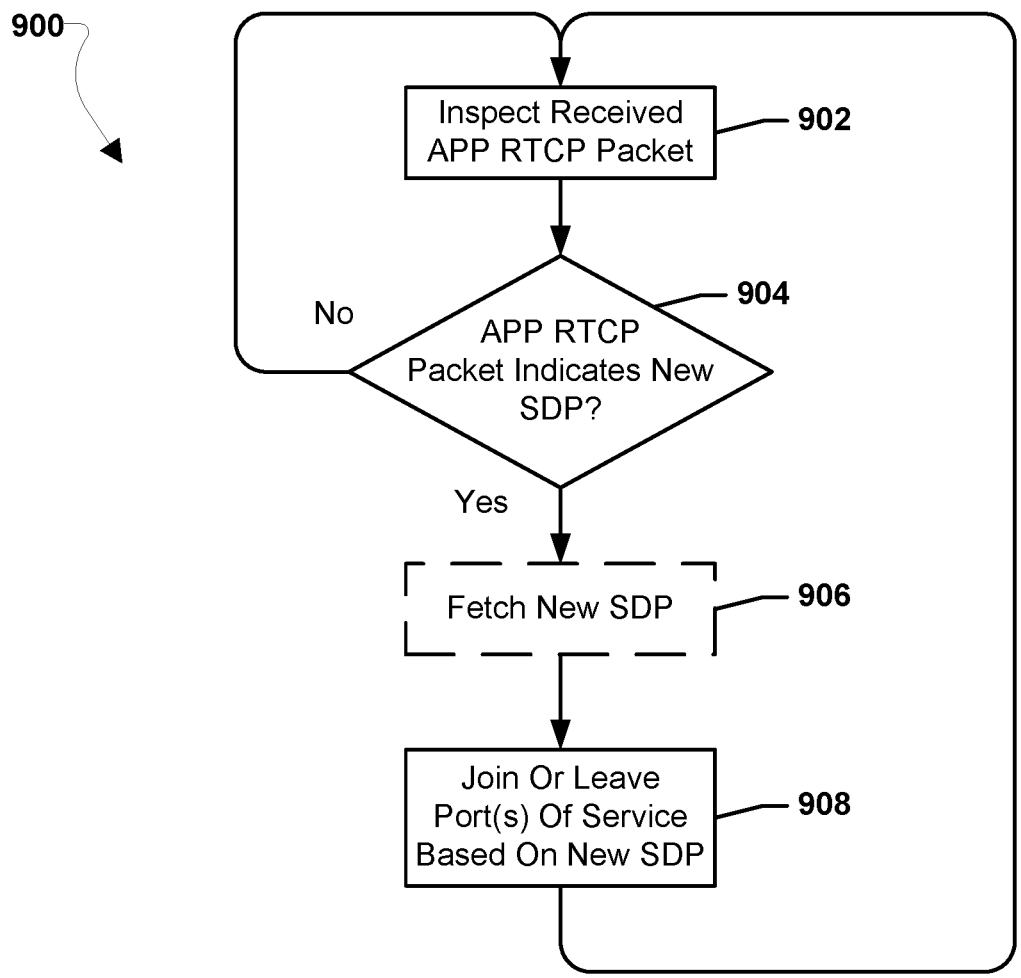
FIG. 9 is a process flow diagram illustrating an embodiment method for joining or leaving one or more ports of a service based on a new SDP.

FIG. 9 illustrates an embodiment method 900 for joining or leaving one or more ports of a service based on a new SDP. In an embodiment, the operations of method 900 may be performed by a RTP client of an application, such as a group call application, running on a processor of a computing device. In block 902 the RTP client may inspect a received APP RTCP packet. For example, the RTP client may inspect the APP RTCP packet for an indication the packet is an application packet, such as a packet code set to "APP" and/or "204" and an indication that the packet may be associated with an indication of a new SDP being available. In determination block 904 the RTP client may determine whether the APP RTCP packet indicates a new SDP is available. In response to determining a new SDP is not available (i.e., determination block 904="No"), the RTP client may continue to inspect packets in block 902.

In response to determining that a new SDP is available (i.e., determination block 904="Yes"), the RTP client may fetch the new SDP in optional block 906. For example, the RTP client may fetch the new SDP via a HTTP request (e.g., a GET) sent to a local HTTP server of the computing device. Block 906 may be optional, because in some embodiments the new SDP may be carried in the APP RTCP packet and available when the APP RTCP packet is received by the RTP client.

In block 908 the RTP client may join or leave one or more ports of the service based on the new SDP. For example, the RTP client may join an additional control and/or data port at the IP stack when the modified SDP indicates an additional RTP/RTCP stream for the service (e.g., an added video stream) is available. As another example, the RTP client may leave a control and/or data port at the IP stack when the modified SDP indicates a RTP/RTCP stream of the service has stopped (e.g., video streaming is discontinued).

Figure 10:
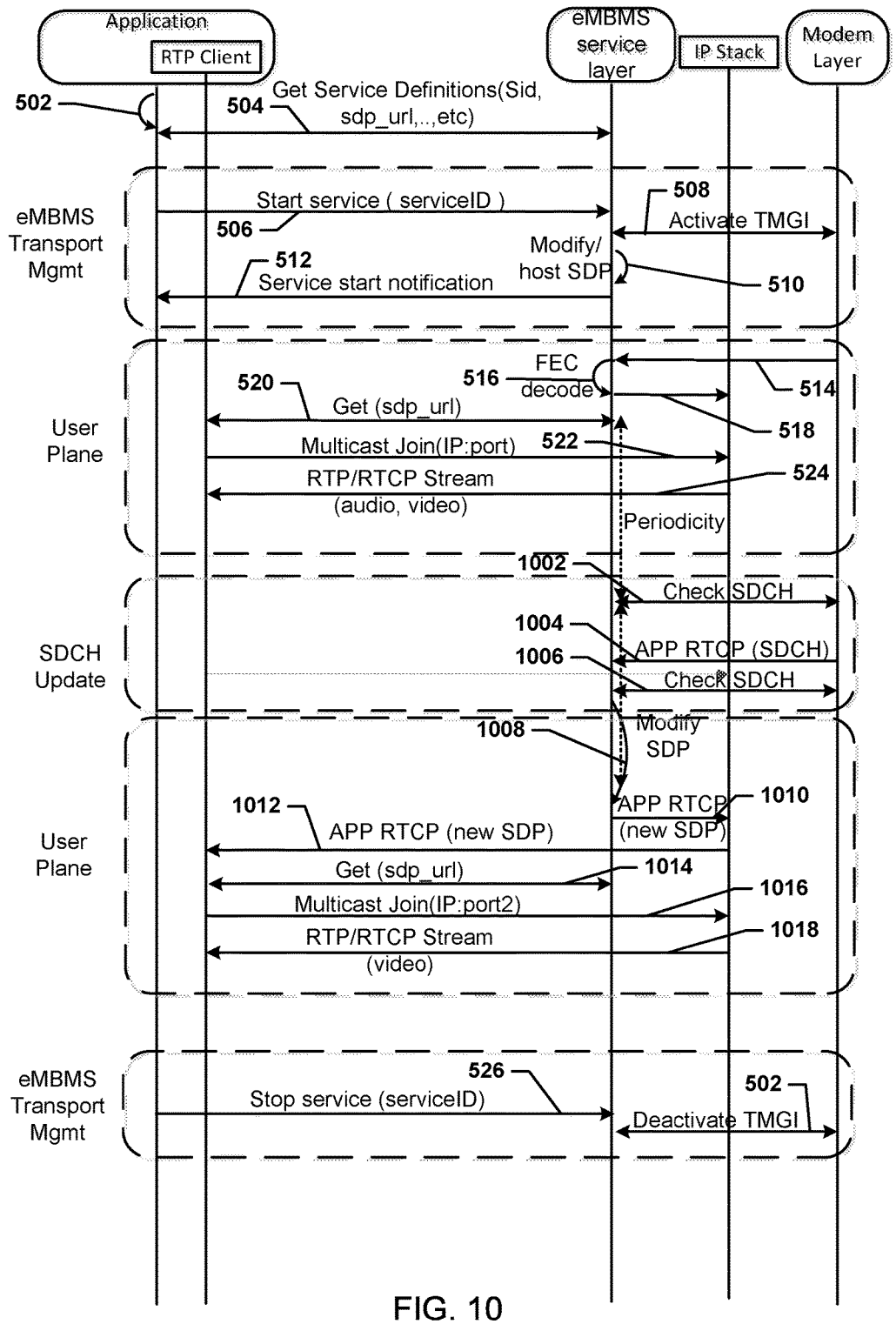
FIG. 10 is a call flow diagram illustrating an embodiment method for providing a session description update for a RTP streaming service according to an embodiment.

FIG. 10 is a call flow diagram illustrating an embodiment method for providing a session description update for a RTP streaming service according to an embodiment. As discussed with reference to FIG. 5, the application, RTP client, eMBMS service layer, IP stack, and modem layer may perform operations 502-524 to provide a service via RTP streaming.

Periodically after providing the SDP to the RTP client, such as every 15 minutes, the eMBMS service layer may check the SDCH for a session description update, such as an updated SDP, in operation 1002. However, session description updates may occur more frequently than the periodicity for checking for session description updates. While the computing device may listen continuously for session description updates, the continuous monitoring of the SDCH in mobile devices may consume battery resources negatively impacting battery life.

In various embodiments, the BMSC may signal a session description update by sending an APP RTCP with the name "SDCH". When the modem layer provides the APP RTCP with the name "SDCH" to the eMBMS service layer in operation 1004, the name "SDCH" may indicate to the eMBMS service layer that a session description update may be available. In this manner, the eMBMS service layer may not be required to continuously listen for session description updates. In operations 1006 the eMBMS service layer may control the modem layer to check the SDCH for the session description update and the eMBMS service layer may receive the session description update, for example as a service announcement fragment including an updated SDP. In operations 1008 the eMBMS service layer may modify the SDP to remove FEC related parameters and/or to change multicast IP address and/or port numbers. In operations 1010 the eMBMS service layer may generate an APP RTCP with the name "new SDP" and place the APP RTCP in the IP stack. In operation 1012 the APP RTCP with the name "new SDP" may be provided from the IP stack to the RTP client.

The RTP client may recognize the APP RTCP with the name "new SDP" as an indication that a new SDP is available, and the RTP client of the application may send an HTTP request (e.g., a GET) to the local HTTP server operating within the eMBMS service layer to fetch the new SDP in operations 1014. For example, when the new SDP indicates a new stream (e.g., a video stream) is available for the service, the RTP client may join the control and data port for the service at the IP stack indicated in the SDP in operations 1016. In response to multicast joining the IP addresses and ports of the service at the IP stack, the RTP client may receive and consume the RTP stream of packets (e.g., video packets) in the IP stack in operations 1018 and the application may render the service.

Figure 11:
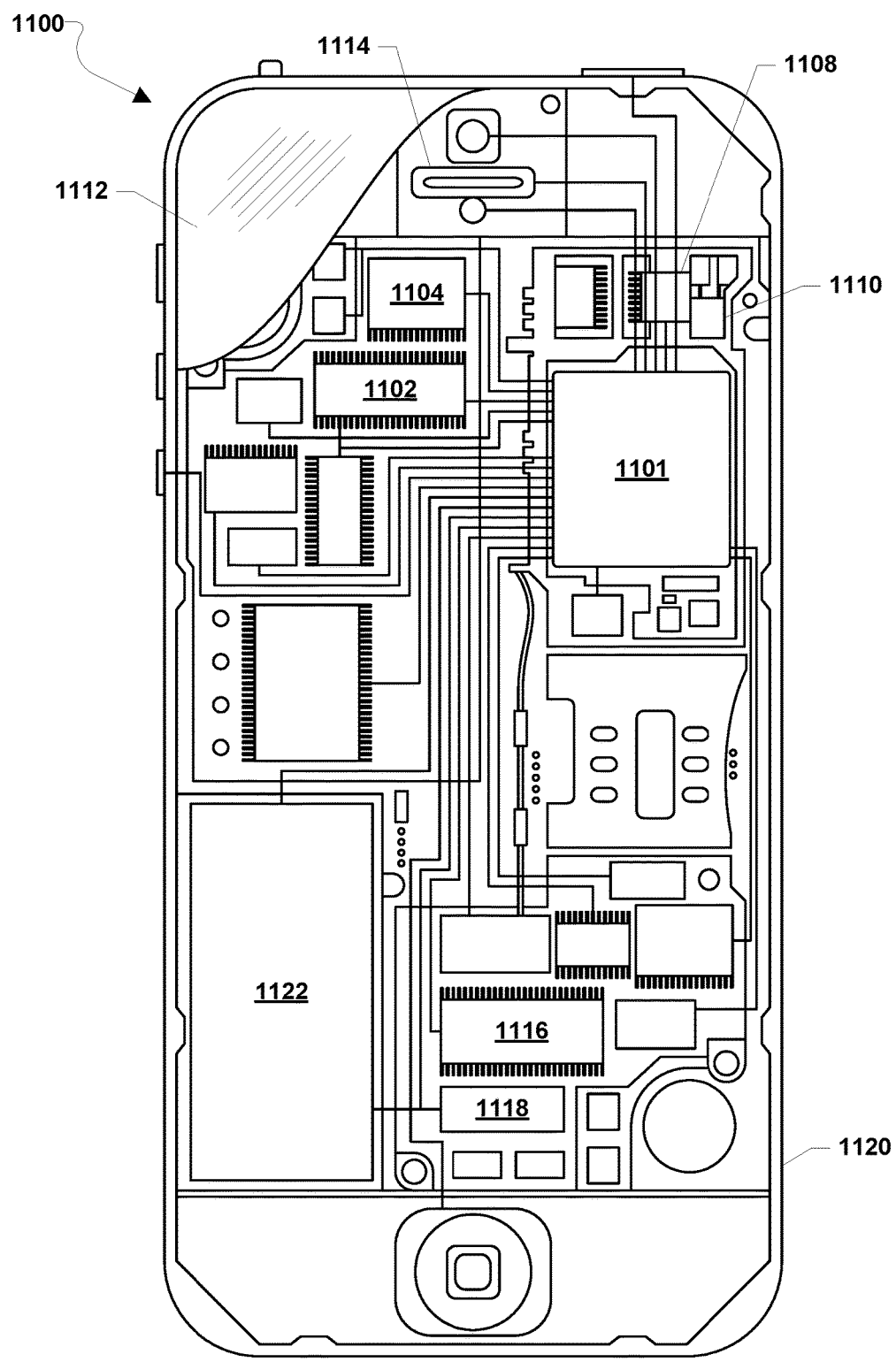
FIG. 11 is a component diagram of an example computing device suitable for use with the various embodiments.

The various embodiments (including, but not limited to, embodiments discussed above with reference to FIGS. 1-10) may be implemented in any of a variety of the computing devices (e.g., mobile devices), an example of which is illustrated in FIG. 11. For example, the mobile device 1100 may include a processor 1101 coupled to a touch screen controller 1104 and an internal memory 1102. The processor 1101 may be one or more multicore integrated circuits (ICs) designated for general or specific processing tasks. The internal memory 1102 may be volatile or non-volatile memory, and may also be secure and/or encrypted memory, or unsecure and/or unencrypted memory, or any combination thereof. The touch screen controller 1104 and the processor 1101 may also be coupled to a touch screen panel 1112, such as a resistive-sensing touch screen, capacitive-sensing touch screen, infrared sensing touch screen, etc. The mobile device 1100 may have one or more radio signal transceivers 1108 (e.g., Peanut®, Bluetooth®, Zigbee®, Wi-Fi, RF, cellular (e.g., CDMA, TDMA, GSM, PCS, 3G, 4G, LTE, etc.), etc.) and antennae 1110, for sending and receiving, coupled to each other and/or to the processor 1101. The transceivers 1108 and antennae 1110 may be used with the above-mentioned circuitry to implement the various wireless transmission protocol stacks and interfaces. The mobile device 1100 may include a cellular network wireless modem chip 1116 that enables communication via a cellular network and is coupled to the processor. The mobile device 1100 may include a peripheral device connection interface 1118 coupled to the processor 1101. The peripheral device connection interface 1118 may be singularly configured to accept one type of connection, or multiply configured to accept various types of physical and communication connections, common or proprietary, such as USB, FireWire, Thunderbolt, or PCIe. The peripheral device connection interface 1118 may also be coupled to a similarly configured peripheral device connection port (not shown). The mobile device 1100 may also include speakers 1114 for providing audio outputs. The mobile device 1100 may also include a housing 1120, constructed of a plastic, metal, or a combination of materials, for containing all or some of the components discussed herein. The mobile device 1100 may include a power source 1122 coupled to the processor 1101, such as a disposable or rechargeable battery. The rechargeable battery may also be coupled to the peripheral device connection port to receive a charging current from a source external to the mobile device 1100.

Figure 12:
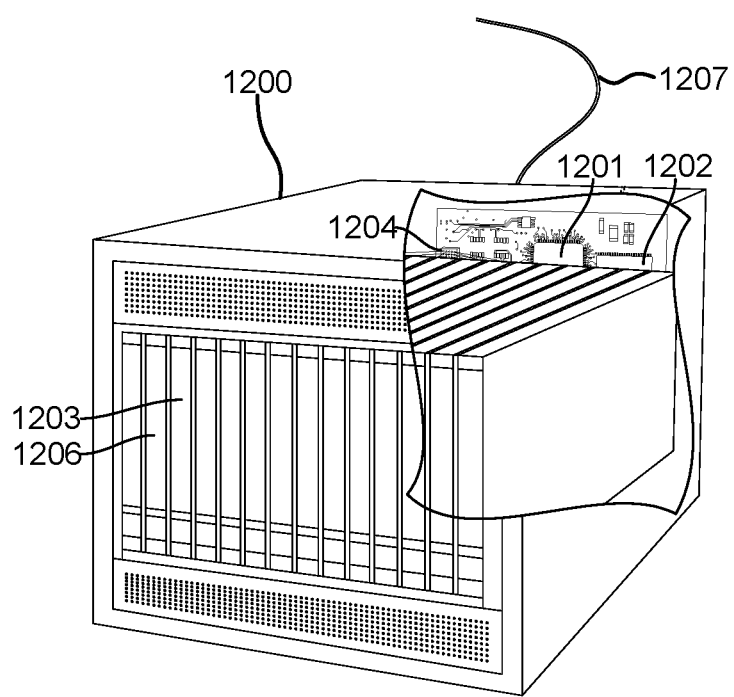
FIG. 12 is a component diagram of an example server suitable for use with the various embodiments.

The various embodiments (including, but not limited to, embodiments discussed above with reference to FIGS. 1-10) may also be implemented on any of a variety of commercially available server devices, such as the server 1200 illustrated in FIG. 12. Such a server 1200 typically includes a processor 1201 coupled to volatile memory 1202 and a large capacity nonvolatile memory, such as a disk drive 1204. The server 1200 may also include a floppy disc drive, compact disc (CD) or DVD disc drive 1206 coupled to the processor 1201. The server 1200 may also include one or more network transceivers 1203, such as a network access port, coupled to the processor 1201 for establishing network interface connections with a communication network 1207, such as a local area network coupled to other announcement system computers and servers, the Internet, the public switched telephone network, and/or a cellular network (e.g., CDMA, TDMA, GSM, PCS, 3G, 4G, LTE, or any other type of cellular network).

The processors 1101 and 1201 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory before they are accessed and loaded into the processors 1101 and 1201. The processors 1101 and 1201 may include internal memory sufficient to store the application software instructions. In many devices the internal memory may be a volatile or nonvolatile memory, such as flash memory, or a mixture of both. For the purposes of this description, a general reference to memory refers to memory accessible by the processors 1101 and 1201 including internal memory or removable memory plugged into the device and memory within the processors 1101 and 1201 themselves.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module, which may reside on a non-transitory computer-readable or processor-readable storage medium. Non-transitory server-readable, computer-readable or processor-readable storage media may be any storage media that may be accessed by a computer or a processor. By way of example but not limitation, such non-transitory server-readable, computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory server-readable, computer-readable and processor-readable media. Additionally, the operations of a method or algorithm may reside as one or any combination or set of codes and/or instructions on a non-transitory server-readable, processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for updating a service description for a Real-Time Transport Protocol (RTP) streaming service over evolved Multimedia Broadcast Multicast Service (eMBMS), comprising:
   receiving an application defined RTP Control Protocol (RTCP) packet (APP RTCP packet) including an indication that a service description update occurred at an eMBMS service layer of a computing device consuming the RTP streaming service, wherein the service description update is separate from the APP RTCP packet;
   determining, in the eMBMS service layer, whether the APP RTCP packet indicates that the service description update occurred; and
   receiving the service description update in response to determining that the APP RTCP packet indicates that the service description update occurred.

2. The method of claim 1, wherein receiving the service description update in response to determining that the APP RTCP packet indicates that the service description update occurred comprises reading a service discovery channel (SDCH) to receive the service description update in response to determining that the APP RTCP packet indicates that the service description update occurred.

3. The method of claim 1, wherein the service description update is received as a service announcement fragment.

4. The method of claim 3, wherein the service announcement fragment includes an updated SDP.

5. The method of claim 1, further comprising:
   generating, in the eMBMS service layer, an APP RTCP packet indicating that a new SDP is available in response to receiving the service description update; and
   sending the APP RTCP packet indicating that the new SDP is available to an RTP client of the computing device consuming the RTP streaming service.

6. The method of claim 5, wherein the APP RTCP packet includes the new SDP.

7. The method of claim 5, further comprising fetching the new SDP in response to receiving the APP RTCP packet indicating that the new SDP is available.

8. The method of claim 5, further comprising joining or leaving one or more ports of the RTP streaming service in response to receiving the APP RTCP packet indicating that the new SDP is available at the RTP client.

9. The method of claim 1, further comprising:
   determining, in the eMBMS service layer, a type of the service description update based at least in part on a name of the APP RTCP packet; and
   consuming, in the eMBMS service layer, the service description update based on the determined type of the service description update.

10. The method of claim 1, wherein the RTP streaming service is a Mission Critical Push-to-Talk (MCPTT) over Long Term Evolution (LTE) group call.

11. A computing device, comprising:
   a processor configured with processor-executable instructions to perform operations comprising:
      receiving an application defined Real-Time Transport Protocol (RTP) Control Protocol (RTCP) packet (APP RTCP packet) including an indication that a service description update occurred at an evolved Multimedia Broadcast Multicast Service (eMBMS) service layer of the computing device while the computing device is consuming an RTP streaming service over eMBMS, wherein the service description update is separate from the APP RTCP packet;
      determining, in the eMBMS service layer, whether the APP RTCP packet indicates that the service description update occurred; and
      receiving the service description update in response to determining that the APP RTCP packet indicates that the service description update occurred.

12. The computing device of claim 11, wherein the processor is configured with processor-executable instructions to perform operations such that receiving the service description update in response to determining that the APP RTCP packet indicates that the service description update occurred comprises reading a service discovery channel (SDCH) to receive the service description update in response to determining that the APP RTCP packet indicates that the service description update occurred.

13. The computing device of claim 11, wherein the service description update is received as a service announcement fragment.

14. The computing device of claim 11, wherein the processor is configured with processor-executable instructions to perform operations further comprising:

generating, in the eMBMS service layer, an APP RTCP packet indicating that a new SDP is available in response to receiving the service description update; and sending the APP RTCP packet indicating that the new SDP is available to an RTP client of the computing device.

15. The computing device of claim 14, wherein the APP RTCP packet includes the new SDP.

16. The computing device of claim 14, wherein the processor is configured with processor-executable instructions to perform operations further comprising fetching the new SDP in response to receiving the APP RTCP packet indicating that the new SDP is available.

17. The computing device of claim 14, wherein the processor is configured with processor-executable instructions to perform operations further comprising joining or leaving one or more ports of the RTP streaming service in response to receiving the APP RTCP packet indicating that the new SDP is available at the RTP client.

18. The computing device of claim 11, wherein the processor is configured with processor-executable instructions to perform operations further comprising:

determining, in the eMBMS service layer, a type of the service description update based at least in part on a name of the APP RTCP packet; and consuming, in the eMBMS service layer, the service description update based on the determined type of the service description update.

19. The computing device of claim 11, wherein the RTP streaming service is a Mission Critical Push-to-Talk (MCPTT) over Long Term Evolution (LTE) group call.

* * * * *